May 27, 1958 K. A. WRIGHT 2,836,447
CLAMP RING FOR PIPE
Filed March 21, 1952 2 Sheets-Sheet 1

INVENTOR,
KENNETH A. WRIGHT
BY Lyon & Lyon
ATTORNEYS

May 27, 1958 K. A. WRIGHT 2,836,447
CLAMP RING FOR PIPE
Filed March 21, 1952 2 Sheets-Sheet 2

INVENTOR,
KENNETH A. WRIGHT
BY
*Lyon & Lyon*
ATTORNEYS

2,836,447

CLAMP RING FOR PIPE

Kenneth A. Wright, Los Angeles, Calif.

Application March 21, 1952, Serial No. 277,755

13 Claims. (Cl. 287—52.03)

This invention relates to well drilling and completion apparatus and is particularly directed to an improved form of clamp ring or stop collar for mounting on a well pipe.

Clamp rings or stop collars are commonly welded upon a pipe prior to insertion into a well bore. On certain types of high strength alloy pipe, however, welding is objectionable because of cracking and stress concentrations. Accordingly, I provide a clamp ring or collar which may be fixed to the outer surface of a well pipe without welding.

The principal object of this invention is to provide a clamp ring which may be applied laterally to a well pipe and fixed on the outer surface thereof without requiring that the collar be welded to the pipe.

Another object is to provide a collar formed of generally semi-circular segments clamped together by threaded fastenings and fixed by novel means against movement on the pipe.

Another object is to provide a collar of this type having button members with serrated surfaces for engaging the outer surface of the pipe.

A more detailed object is to provide a clamping device of this type in which the button members are restrained from turning movement.

Other and more detailed objects and advantages will appear hereinafter.

Figures 11, 12:
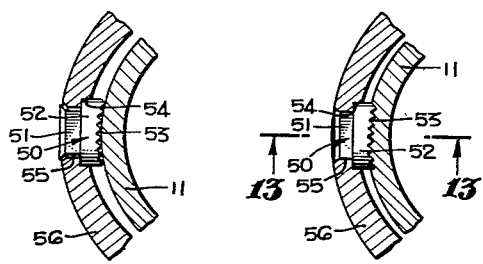
Figure 13:
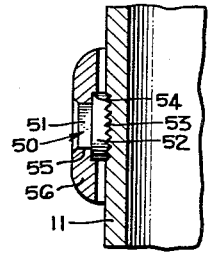

Figures 11–13 show a further modified form of button member. Figure 11 is a sectional plan view showing the position of the parts before tightening of the button members. Figure 12 is a sectional plan view showing the position of the parts after the button members have been tightened in the clamp ring. Figure 13 is a sectional elevation taken substantially on the line 13—13 as shown in Figure 12.

Figure 14:
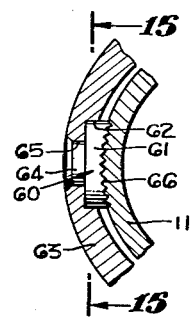

Figure 14 is a sectional plan view showing a further modified form of button members.

Figure 15:
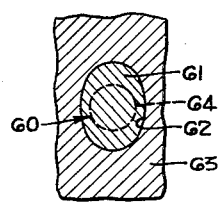

Figure 15 is a sectional detail taken substantially on the line 15—15 as shown in Figure 14.

Figure 16:
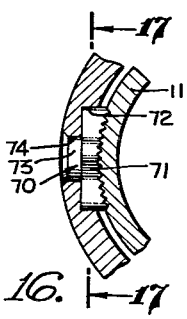

Figure 16 is a sectional plan view showing another modified form of button members.

Figure 17:
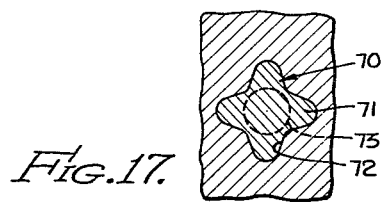

Figure 17 is a sectional view taken substantially on the line 17—17 as shown in Figure 16.

Figure 1:
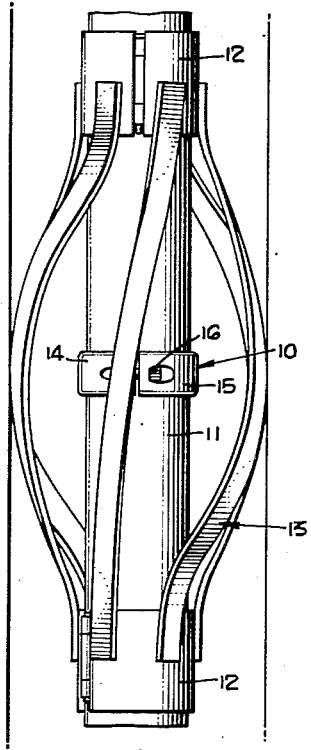
Figure 1 is a side elevation showing a clamp ring or stop collar embodying my invention and positioned on a well pipe between the end collars of a casing centralizer.

Referring to the drawings the clamp ring or stop collar 10 is constructed so that it may be fixed on the outer surface of a well pipe 11. As shown in Figure 1, the clamp ring 10 may be placed between the spaced collars 12 on a casing centralizer 13. In this use of the clamp ring 10 it engages the upper collar 12 when the pipe 11 is raised, and it engages the lower collar 12 when the pipe 11 is lowered.

Figure 2:
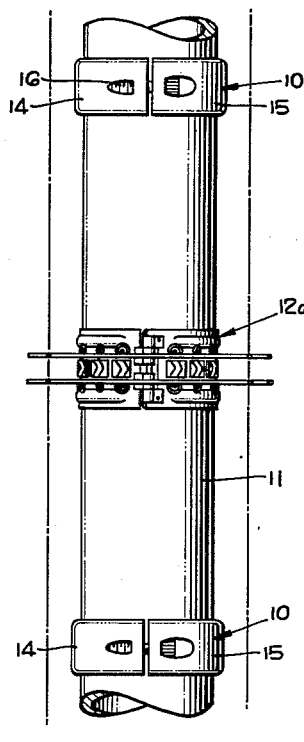
Figure 2 is a side elevation showing a pair of stop collars embodying my invention mounted on a well pipe to limit the axial movement of a well scratcher positioned on the pipe between the collars.
Figure 3:
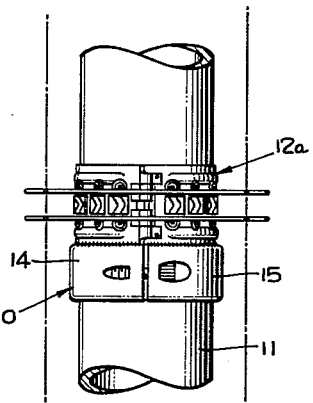
Figure 3 is a side elevation showing a modified form of my device.

In the use of the device as shown in Figure 2 the clamp rings 10 are fixed on the pipe at axially spaced locations and act as stop collars to limit the travel of the wall scratcher device 12ª. This scratcher device may be of the general type shown in my Patent No. 2,506,405, issued May 2, 1950. When the pipe 11 is lowered the upper clamp ring 10 engages the scratcher device 12ª and carries it downward. When the pipe 11 is raised the lower clamp ring 10 engages the scratcher device 12ª and carries it upward.

Figure 4:
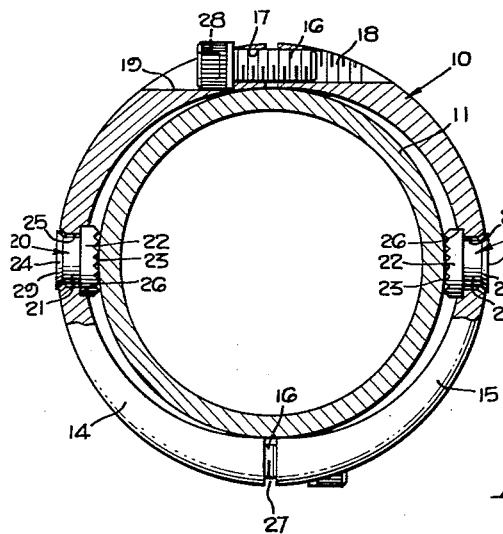
Figure 4 is a plan view partly in section showing the parts of the device as initially applied to the pipe.
Figure 5:
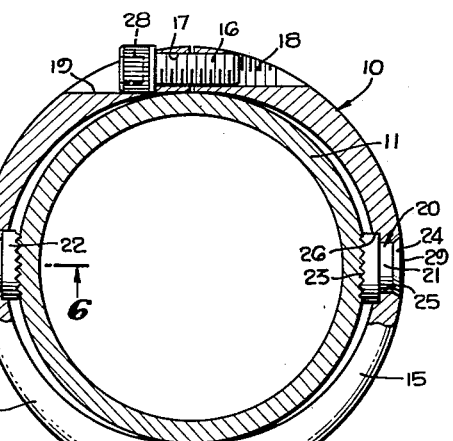
Figure 5 is a view similar to Figure 4 showing the final position of the parts in clamping relationship.
Figure 7:
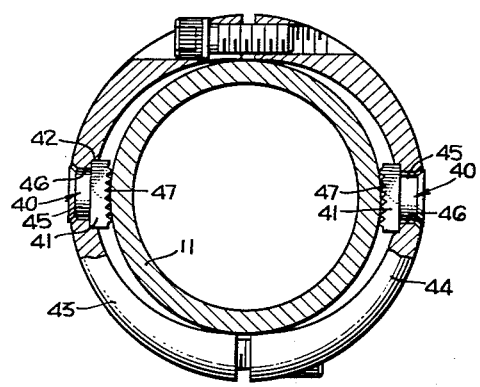
Figure 7 is a view similar to Figure 4 showing a modified form of button members.

As shown in Figures 4 and 5 the clamp ring 10 includes a pair of generally semi-circular segments 14 and 15. These segments may be duplicates and they are held in assembled relation by means of threaded elements such as cap screws 16. The cap screw passes through a smooth bore 17 on one of the sections and engages within a threaded opening 18 in the other section. A clearance space or counterbore 19 provides clearance for the enlarged head of each cap screw. The radial thickness of the sections 14 and 15 varies from a maximum near the ends of each section to a minimum near the central part of each section.

Means are provided for fixing each of the sections 14 and 15 to the pipe 11, and as shown in the drawings this means includes a button member 20 having a cylindrical portion 21 and an enlarged head 22. The head 22 may be circular in shape and is provided with a serrated surface 23. The portion of the head adjacent the serrated surface 23 is hardened while the remainder of the head 22 and the cylindrical portion 21 are relatively soft. An outer flared lip 24 is provided on the button member 20 to prevent its disassembly from the ring section.

Each button member 20 is initially assembled into one of the ring sections from the inside thereof. The cylindrical portion 21 passes loosely through a radially extending cylindrical bore 25. The head 22 is received within a counterbore 26. The lip 24 is formed on the button member 20 after it is in position and acts to prevent disassembly.

Figure 6:
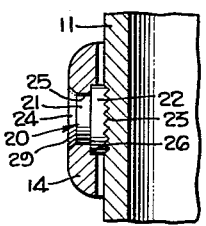
Figure 6 is a sectional detail taken substantially on the line 6—6 as shown in Figure 5.

When the clamp ring is to be applied to the pipe the two sections 14 and 15 are assembled about the pipe and the cap screws 16 are used to bring the parts to the position shown in Figure 4. In this position the serrated surface 23 on the head 22 of each of the button members 20 initially engages the outer surface of the pipe 11. A relatively wide gap 27 is present between the adjacent ends of the sections 14 and 15 when the parts are in this initial position. A suitable wrench tool (not shown) is inserted into the hollow hexagon portion 28 of each of the cap screws 16 in order to facilitate turning thereof. The cap screws 16 are turned by means of such tool to tighten the engagement between the threads on the cap screws and the threads 18 on the sections 14 and 15. A hammer or other blunt instrument is then used to deliver impact blows to the exposed ends 29 of the button members 20. These impact blows drive the teeth formed by the serrations on the face 23 into the material of the pipe 11 as shown in Figure 6. These impact blows also cause the cylindrical portion 21 to swell within the bore 25. The hammer blows may be delivered to the button members 20 simultaneously with turning of the cap screws 16, or the hammer and thread tightening operations may proceed alternately. In either event the button members 20 have their hardened serrated faces driven into the material of the pipe 11 and their softer shank portions 21 are expanded into the bores 25. Looseness between the flanged head 22 and the end surface of the counterbores 26 is taken up by tightening the cap screws 16 with the wrench. When continuing hammering on the exposed ends 29 of the button members 20 does not result in loosening of the threaded engagement between the cap screws 16 and threads 18 the installation operations are complete. The pipe is then solidly gripped between the diametrically opposed button members 20 and the ring sections 14 and 15 are held in clamped position by means of the cap screws 16.

In the modified form of my invention shown in Figures 7–10, the individual button members 40 are each provided with a head 41 which is substantially square and which is received in a similarly shaped recess 42 provided on one of the ring sections 43 and 44. The shank portion 45 of each button member is cylindrical and is loosely received within a cylindrical bore 46.

Figure 8:
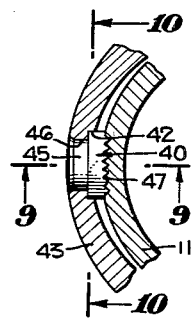
Figure 8 is a fragmentary sectional view of the device of Figure 7 showing the position of the parts after tightening of the button members within the clamp ring.
Figure 9:
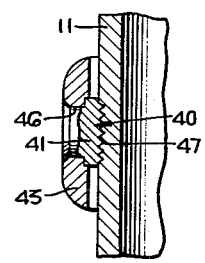
Figure 9 is a longitudinal sectional view taken substantially on the line 9—9 as shown in Figure 8.

The serrated face 47 of each button member is not flat but is curved to fit the contour of the pipe 11. In this way the serrations at the outer edges of the head 41 engage the pipe surface to the same extent as the serrations at the center of the head 41. The interengagement of the square head 41 with the square recess 42 prevents turning movement of the button member with respect to the ring section and hence insures proper contact between the curved serrated surface 47 and the curved surface of the pipe 11. The manner of mounting and installation of the ring sections on the pipe is substantially the same as previously described. Figures 8 and 9 show how the shank 45 of each button member 40 is expanded to fill the bore 46 and how the curved serrated surface 47 engages the surface of the pipe 11.

The modified form of the invention shown in Figures 11–13 employs button members 50 each having a substantially square shank 51 and a substantially round head 52. The serrated face 53 is curved to conform to the outer surface of the pipe 11. The round head 52 is received within a round counterbore 54. The square shank is loosely received within a substantially square bore 55 and the button member 50 is thus prevented from turning with respect to the clamp ring section 56. Figures 12 and 13 show how the serrated face 53 may be imbedded in the outer surface of the pipe 11 and how the square shank 51 may be expanded to fill the square bore 55.

The modified form of my invention shown in Figures 14 and 15 employs a button member 60 having an oval shaped head 61 received in an oval shaped counterbore 62 in the clamp ring section 63. The shank 64 is cylindrical and is received in a cylindrical bore 65. The oval shape of the head increases the arc of contact of the curved serrated face 66 without corresponding increase in the maximum vertical dimension of the button member 60. The interengagement of the oval head 61 and oval counterbore 62 prevents turning movement of the button member 60. If desired, the long dimension of the oval counterbore 62 can extend axially instead of circumferentially of the pipe 11.

In Figures 16 and 17 a further modified form of the invention is shown. The button member 70 is provided with a substantially star-shaped head 71 received in a corresponding star-shaped recess 72. The shank 73 is circular and is received in a circular bore 74. The interfitting star-shapes of the head 71 and counterbore 72 prevent turning movement of the button member 70.

Figure 10:
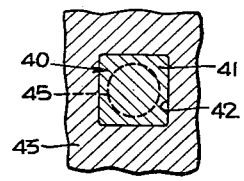
Figure 10 is a sectional view partly broken away taken substantially on the line 10—10 as shown in Figure 8.

The various noncircular counterbores shown in Figures 10, 15 and 17 may be formed by an end milling operation or by any other convenient or desirable means. These noncircular shapes prevent turning movement of the button members and thereby maintain the curved serrated contact faces of the button members in proper relationship to the curved surface of the pipe 11.

Having fully described my invention, it is to be understood that I do not wish to be limited to the details herein set forth, but my invention is of the full scope of the appended claims.

I claim:

1. A sectional clamp ring adapted to be secured upon a well pipe, comprising in combination: a plurality of arcuate sections cooperable to encircle the pipe, adjustable means at the adjacent ends of the sections for clamping them together, each section having a radial bore extending therethrough and located intermediate the ends of the section, a button member having a shank portion loosely mounted in each of said bores, each button member having a pipe-engaging flange portion provided with a serrated face, each section having a counterbore end surface engaging the flange portion of the button member, each shank portion having an exposed portion accessible exteriorly of its respective section to which a series of hammer blows may be applied to drive the serrated face into the surface of the pipe, whereby the clamp means may be tightened, the button members and said clamp means cooperating to maintain the clamp ring in fixed position on the pipe.

2. A sectional clamp ring adapted to be secured upon a well pipe, comprising in combination: a pair of duplicate generally semi-circular sections cooperable to encircle the pipe, threaded means at the adjacent ends of the sections for clamping them together, each section having a radial bore extending therethrough and located intermediate the ends of the section, a button member having a shank loosely mounted in each of said bores, each button member having a flange portion provided with a serrated face for engaging the outer surface of the pipe, each section having a counterbore end surface engaging the flange portion of the button member, each shank having an exposed portion accessible exteriorly of its respective section to which a series of hammer blows may be applied to drive the serrated face into the surface of the pipe, whereby the threaded means may be tightened, the button members being diametrically positioned on the clamp ring, the button members and said threaded means cooperating to maintain the clamp ring in fixed position on the pipe.

3. A sectional clamp ring adapted to be secured upon a well pipe, comprising in combination: a pair of duplicate generally semi-circular sections cooperable to encircle the pipe, threaded means at the adjacent ends of the sections for clamping them together, each section having a radial bore extending therethrough and located symmetrically between the ends of the section, button members each having a relatively hard flange portion provided with a serrated face for engaging the outer surface of the pipe, each section having a counterbore end surface engaging the flange portion of the button member, each button member also having a relatively soft shank loosely mounted in one of said bores, the shank having an exposed end surface accessible exteriorly of its respective section to which a series of hammer blows may be applied to expand the shank into the axial bore and to drive the serrated face into the surface of the pipe, whereby the threaded means may be tightened, the button members being diametrically positioned on the clamp ring, the button members and threaded means cooperating to maintain the clamp ring in fixed position on the pipe.

4. A sectional clamp ring adapted to be secured upon a well pipe, comprising in combination: a plurality of arcuate sections cooperable to encircle the pipe, adjustable means at the adjacent ends of the sections for clamping them together, each section having a transverse opening extending therethrough, a button member mounted in each of said openings, each button member having a relatively hard pipe-engaging head provided with a serrated face, each section having a counterbore end surface engaging the head of the button member, each button member also having a relatively soft shank received in its respective opening, each shank having an exposed portion accessible exteriorly of its respective arcuate section to which a series of hammer blows may be applied to drive the serrated face into the surface of the pipe and to expand the shank into the opening, whereby the adjustable means may be tightened, the button members and said clamp means cooperating to maintain the clamp ring in fixed position on the pipe.

5. A sectional clamp ring adapted to be secured upon a well pipe, comprising in combination: a plurality of arcuate sections cooperable to encircle the pipe, adjustable means at the adjacent ends of the sections for clamping them together, each section having a transverse opening extending therethrough, a button member having a shank mounted in each of said openings, each button member having a flange portion provided with a serrated face curved to conform to the outer surface of the pipe, each section having a counterbore end surface engaging the flange portion of the button member, each button member having an exposed portion of its shank accessible exteriorly of its respective arcuate section to which a series of hammer blows may be applied to drive the curved serrated face into the surface of the pipe, whereby the adjustable means may be tightened, the button members and said clamp means cooperating to maintain the clamp ring in fixed position on the pipe.

6. A sectional clamp ring adapted to be secured upon a well pipe comprising in combination: a plurality of arcuate sections cooperable to encircle the pipe, and said sections being thicker near the ends and thinner intermediate the ends, adjustable means at the adjacent ends of the sections for clamping them together, each section having a radial bore extending therethrough and located intermediate the ends of the section, a button member loosely mounted in said bores, each button member having a pipe engaging flange portion provided with a serrated face, each section having a counterbore end surface engaging the flange portion of the button member, each button member also having an exposed portion accessible exteriorly of its respective section to which a series of hammer blows may be applied to expand the button member, whereby the adjustable means may be tightened, the button members and said clamping means cooperating to maintain the clamp ring in fixed position on the pipe.

7. A sectional clamp ring adapted to be secured upon a well pipe, comprising in combination: a pair of duplicate generally semi-circular sections cooperable to encircle the pipe and being thicker near the ends thereof and thinner intermediate the ends, threaded means at adjacent ends of the sections for clamping them together, each section having a radial bore extending therethrough and located intermediate the ends of the section at the thinnest portion thereof, button members having a flanged portion provided with a serrated face, each section having a counterbore end surface engaging the flange of the button member, each button member also having a relatively soft shank, the shank having an exposed end surface accessible exteriorly of its respective section to which a series of hammer blows may be applied to expand the shank into the axial bore and to drive the serrated faces into the surface of the pipe, whereby the threaded means may be tightened, the button members being automatically positioned on the clamp ring, the button members and threaded means cooperating to maintain the clamp ring in fixed position on the pipe.

8. The combination set forth in claim 1 wherein the button members and arcuate sections have cooperating parts for preventing turning movement of the button members.

9. The combination set forth in claim 1 wherein each button member has a non-circular head received within a non-circular counterbore on one of the arcuate sections.

10. The combination set forth in claim 1 wherein the shanks and radial bores are non-circular to prevent rotation of the button members.

11. The combination set forth in claim 1 wherein each flange portion is substantially square and is received within a substantially square counterbore on one of the arcuate sections, to prevent rotation of the button members.

12. The combination set forth in claim 1 wherein each radial bore is provided with an oval counterbore, wherein the flange portion of the button member conforms to the shape of the counterbore to prevent rotation of the button member.

13. The combination set forth in claim 1 wherein each radial bore is provided with a star-shaped counterbore and wherein a flange portion of each button member is shaped to conform to said counterbore to prevent rotation of the button member.

References Cited in the file of this patent

UNITED STATES PATENTS

| | | |
|---|---|---|
| 361,323 | Rochow | Apr. 19, 1887 |
| 439,493 | Eames | Oct. 28, 1890 |
| 774,398 | Reine | Nov. 8, 1904 |
| 911,124 | Gately | Feb. 2, 1909 |
| 1,024,344 | Langevin | Apr. 23, 1912 |
| 1,174,858 | Hamilton | Mar. 7, 1916 |
| 1,532,596 | Madsen | Apr. 7, 1925 |
| 1,593,936 | Goodwin | July 27, 1926 |
| 1,619,793 | Kerr | Mar. 1, 1927 |
| 2,018,452 | Laughlin | Oct. 22, 1935 |
| 2,023,951 | Cohan | Dec. 10, 1935 |
| 2,163,315 | Dalrymple | June 20, 1939 |
| 2,388,416 | Johnson | Nov. 6, 1945 |
| 2,552,618 | Boatright | May 15, 1951 |
| 2,591,763 | Abegg | Apr. 8, 1952 |
| 2,609,720 | Barnard | Sept. 9, 1952 |